United States Patent [19]

Pugach

[11] 4,434,240

[45] Feb. 28, 1984

[54] RECOVERY OF NOBLE METAL VALUES FROM CARBONYLATION RESIDUES

[75] Inventor: Joseph Pugach, Ho-Ho-Kus, N.J.

[73] Assignee: The Halcon SD Group, Inc., New York, N.Y.

[21] Appl. No.: 321,362

[22] Filed: Nov. 16, 1981

[51] Int. Cl.$^3$ .................. B01J 31/40; B01J 23/96; C07C 51/10; C01G 55/00
[52] U.S. Cl. .................... 502/24; 260/546; 260/549; 423/22; 502/25; 502/29
[58] Field of Search ............ 252/412, 413, 414, 415; 423/22; 260/549, 546; 562/607, 608

[56] References Cited

U.S. PATENT DOCUMENTS

| | | | |
|---|---|---|---|
| 3,547,964 | 7/1968 | Olivier | 260/429 |
| 3,560,539 | 4/1968 | Booth | 260/429 |
| 3,887,489 | 6/1975 | Fannin et al. | 252/413 |
| 3,998,622 | 12/1975 | Balmat | 75/0.5 AB |
| 4,021,463 | 9/1975 | Kummer et al. | 260/429 R |
| 4,131,640 | 1/1973 | von Kutepow et al. | 423/22 |
| 4,135,911 | 5/1978 | Balmat | 75/0.5 AB |
| 4,241,219 | 12/1980 | Wan | 260/549 |
| 4,246,195 | 1/1981 | Szesci | 260/549 |
| 4,273,578 | 6/1981 | Nesvabda et al. | 423/22 |
| 4,284,586 | 8/1981 | Pugach | 260/549 |
| 4,340,569 | 7/1982 | Davidson et al. | 423/22 |
| 4,340,570 | 7/1982 | Davidson | 423/22 |
| 4,341,741 | 7/1982 | Davidson et al. | 423/22 |

*Primary Examiner*—P. E. Konopka
*Attorney, Agent, or Firm*—William C. Long; Riggs T. Stewart; Harold N. Wells

[57] ABSTRACT

Heavy residues produced by noble metal catalyzed carbonylation reactions and containing Group VIII noble metals, particularly rhodium, are treated with reagents to precipitate solids containing substantially all of the noble metal contained in the residues. The solids may be further treated to recover the noble metals or they may be returned directly for reuse in the carbonylation reaction. Suitable reagents include alkali metal hydroxides, alkali metal peroxides, alkali metal borohydrides, and other reducing agents, such as formaldehyde and acidified sodium bisulfite.

10 Claims, No Drawings

RECOVERY OF NOBLE METAL VALUES FROM CARBONYLATION RESIDUES

PRIOR ART

The invention relates to the carbonylation processes in which carbon monoxide is reacted with esters or ethers to produce anhydrides or higher molecular weight products. More specifically, the invention relates to the recovery for reuse of the noble metal values from residues formed in such carbonylation processes.

The carbonylation processes of interest differ from hydroformylation processes commonly employed industrially. Typically, in hydroformylation carbon monoxide and hydrogen are reacted with olefins to form higher molecular weight aldehydes and alcohols.

Both hydroformylation and carbonylation processes may produce heavy residues which must be removed to avoid detrimental effects on the reaction. The nature of these residues is not always precisely disclosed in the art, but they are thought to be polymers of the reaction products and/or by-products. The chemical nature of the residues and their ability to hold the noble metal-containing catalyst would be expected to relate to the type of reaction being carried out. Thus, recovering the noble-metal values from such residues will require methods particularly suited to the origin of the residues. The methods to be disclosed herein are especially useful with respect to the processes described in commonly-assigned patent applications mentioned later.

Recovery of noble metal values from hydroformylation residues is disclosed in a number of patents, which may reflect the extensive industrial applications of hydroformylation.

In U.S. Pat. No. 3,547,964 residues from the hydroformylation of olefins are treated with a peroxide to precipitate a complex of the noble metal, which can be dissolved by an aqueous solvent and recovered. Before the peroxide treatment, an acid extraction may be used to remove the biphyllic ligand, which would otherwise be oxidized. Preferably, aqueous acid and peroxide are used together, which results in separation of the noble metal from the residues and its extraction with the aqueous phase. In such a case, no solid precipitate appears.

Another patent relating to recovery of noble metals from the residues of the hydroformylation of olefins is U.S. Pat. No. 3,560,539. The residues are mixed with alcohol and then treated by hydrogenation or with hydrides, including sodium borohydride. This treatment is intended to convert to alcohols the aldehydes produced by the hydroformylation of olefins. A solid is produced which contains the noble metal values and which can be separated dissolved, and returned to the reaction zone for further use.

Another method for recovering rhodium from hydroformylation residues in the form of metallic rhodium agglomerates is discussed in U.S. Pat. No. 3,998,622. A base is added to adjust the pH to the range of 3-8 and then the mixture is heated at 115°–175° C. in the presence of water. The process is used with rhodium complex catalysts containing carbon monoxide, hydrogen and trialkyl phosphite ligand. Alcohols may be included in the treated mixture.

In still another method or recovering rhodium disclosed in U.S. Pat. No. 4,021,463, residues from the hydroformylation of olefins are treated with aqueous mineral acids and peroxides to dissolve the rhodium content, which can be separated in the aqueous phase from the remaining portion of the residue. The rhodium in the aqueous phase is then converted to an active catalytic form for reuse.

Recovery of rhodium in the residues from the hydroformylation of olefins may be carried out according to U.S. Pat. No. 4,135,911 by treating with alcohols, water, oxygen, and a base and heating to precipitate rhodium. The treatment oxidizes the phosphorus ligand present in the residues. Thereafter, metallic rhodium is oxidized to permit its reuse.

Previous disclosures of methods for recovering noble metals from carbonylation processes have been directed to processes in which the presence of heavy residues has not been mentioned.

In U.S. Pat. No. 3,887,489 is disclosed the recovery of rhodium from carbonylation processes which employ rhodium halide carbonyl complexes. Rhodium is precipitated from spent catalyst solutions by heating to 100°–190° C., preferably in the presence of an alkyl alcohol, and thereafter converted to an active form for reuse. It should be noted that the process appears to have been applied to carbonylation of methanol to acetic acid and the principal objective of the rhodium recovery process was the separation from metallic corrosion products.

U.S. Pat. No. 4,131,640 presents still another method of precipitating rhodium from a rhodium carbonyl complex used for carbonylation of an alkanol or an olefin. The rhodium is deposited on a solid carrier, which is then treated to convert the rhodium back into a carbonyl complex. The precipitation occurs as a result of hydrogenation of the initial rhodium-containing solution at 20°–300° C. Again, the technique is used in carbonylation reactions which apparently produce a homogeneous product mixture and formation of residues is not noted.

The recovery of rhodium or other noble metal catalysts from the residues formed in the carbonylation of esters or ethers to form anhydries has been the subject of commonly-assigned U.S. patent applications, namely Ser. Nos. 241,193, 241,180, 241,181. The present invention is directed to additional techniques by which such residues may be treated to recover their noble metal content for reuse.

SUMMARY OF THE INVENTION

Group VIII noble metals, typically rhodium, are recovered from the heavy residues of the noble metal catalyzed carbonylation reactions in which esters and ethers are combined with carbon moxoxide to form anhydrides or other higher molecular weight products. The residue is separated from the carbonylation reaction mixture and then treated with a suitable reagent capable of precipitating solids which contain substantially all of the noble metal contained in the residue. The solids may be further treated to recover the noble metals, but they may be returned directly to the carbonylation reactor and reused without further preparation.

Various reagents may be employed according to the invention. Specific embodiments include the use of peroxides, alkali metal hydroxides, alkali metal borohydrides, and other reducing agents, such as formaldehyde and acidified sodium bisulfite.

After precipitation the solids containing the noble metal values may be treated with an aqueous solution of hydrogen peroxide to dissolve a portion of the organic material, but leaving the noble metal in the solids. Such a treatment can concentrate the noble metal values significantly and reject a potion of the residues.

DESCRIPTION OF THE PREFERRED EMBODIMENTS

The recovery of Group VIII noble metals, especially rhodium, from carbonylation and hydroformylation reaction mixtures has been of considerable interest to those skilled in the art. Of particular concern to the present inventor is the recovery of Group VIII noble metals, particularly rhodium, from catalysts used in the carbonylation of a carboxylate ester or an alkyl ether to an anhydride, or to higher molecular weight products, especially the carbonylation of methyl acetate or dimethyl ether to acetic anhydride. In another aspect, the invention relates to recovery of similar rhodium catalysts used for the carbonylation in the presence of hydrogen of methyl acetate and/or dimethyl ether to ethylidene diacetate. These processes have been described in depth in British Pat. Nos. 1,468,940 and 1,538,782 and are summarized in U.S. patent applications Ser. Nos. 241,193; 241,180; and 241,181 all filed Mar. 6, 1981. The processes are important since they produce chemicals of value, both for direct use and as intermediates. However, the recovery of Group VIII noble metals according to the present invention is not considered to be necessarily limited to the specific carbonylation processes of particular interest.

The invention broadly relates to the selective removal of the noble metals by precipitation from the heavy high-boiling residues, produced by carbonylation reactions, with or without hydrogen being present. These heavy residues are complex and their chemical composition is not fully characterized. Where they have been produced during the carbonylation of ester or ethers, they are known to contain high molecular weight compounds with organic carbonyl and acetate functions. If a sample of a carbonylation reaction mixture is flashed and concentrated the residues which are recovered typically contain up to about 4 percent by weight rhodium after the volatile constituents have been removed. We have now found that it is possible to precipitate solids containing essentially all of the noble metals directly from the carbonylation reaction residues.

The carbonylation reaction mixture typically produces high-boiling residues which may be tolerated, but which cannot be allowed to accumulate indefinitely. The rate at which the residues are produced and their composition will depend upon many factors, not fully understood at this time. The rate at which the residues should be removed and the level to which they are permitted to accumulate in the reaction mixture is established empirically for a particular reaction system. Typically, the reactor will be operated so that the products and other light materials will be flashed off—either from the reacting mixture itself or from a slip stream which is recycled to the reactor. In either case, heavier materials not flashed off accumulate and a portion of these materials is separated and then concentrated to leave only the heaviest materials, which are then treated to precipitate the noble metal values according to the methods of the invention.

In its broadest aspect, the invention comprises a process for recovering Group VIII noble metals from the residues of noble metal catalyzed carbonylation reactions in which esters and ethers are combined with carbon monoxide to form anhydrides or other higher molecular weight products. The process separates the residues from the carbonylation reaction mixture and then treats the residue with a suitable reagent capable of precipitating a solid containing substantially all of the noble metal content of the residue. A solvent may be employed to facilitate handling of the residue.

Separation of the residue from the carbonylation reaction mixture may be carried out by flashing of the mixture to a lower pressure and then returning the vapors to the reactor system. This may be done with the net reactor product or with a slip stream if the products are removed as vapor from the reactor itself. Any desired degree of concentration may be obtained by flashing to lower pressures. Preferably, the residue will be concentrated until substantially all of the volatile components are removed. The noble metal content will have been increased significantly, say up to about 4 wt. percent. The concentrated residue may be viscous and difficult to handle if all of the volatile components have been removed and it may be helpful to add a solvent to assist in further processing for noble metal precipitation. The amount of solvent used may vary widely but typically would be about one part by weight per part of residue. Methanol has been found to be preferred for the residues tested. A number of types of solvents may be employed, such as aliphatic alcohols, ethers, nitriles and the like.

Reagents which have been found useful for the precipitation of noble metals from carbonylation residues include alkali metal peroxides, alkali metal hydroxides, alkali metal borohydrides, other reducing agents such as formaldehyde, and acidified sodium bisulfite.

Of the alkali metal peroxides lithium and sodium diperoxides have been found particularly suitable.

Of the alkali metal hydroxides sodium and lithium hydroxides are preferred.

The alkali metal borohydrides are used in combination with an alkali metal hydroxide to improve recovery of the noble metal. While sodium borohydride is preferred, other members of this class which may be useful include lithium and potassium borohydrides.

Reducing agents which may be used include one or more members of the group consisting of aldehydes, di- and tri-carboxylic acids, and in particular formaldehyde.

While most of the reagents will be used in basic solutions, exceptions are the reducing agents (excluding hydrides) and, notably, acidified sodium bisulfite. Acidity may be provided by one or more strong acids such as mineral acids and sulfonic acids. Hydrogen iodide is particularly useful.

The amount of the reagents used will vary widely depending upon the nature of the residue, the reagents chosen, and the conditions of contacting. In the examples below, an excess of reagent was used to assure that all the rhodium was precipitated, but it will be understood that in practical applications the amount of reagent employed would be optimized. The contacting may be carried out at temperatures of 0° to 150° C., but the temperature is not considered a critical variable. The pressure may be any suitable value, depending upon the temperature and the constituents of the system.

Various embodiments of the invention are illustrated in the following examples, in which the residue was obtained from carbonylation reactions, of which the following is a representative description.

An autoclave is operated continuously to produce acetic anhydride by the carbonylation of methyl acetate. The reactants, i.e. methyl acetate, methyl iodide, carbon monoxide and hydrogen are added continuously. The product acetic anhydride is obtained as a vapor by flashing a withdrawn stream of the reacting mixture. The remaining liquid is recycled to the reactor. The reaction is catalyzed by the mixture of rhodium trichloride trihydrate, and lithium iodide, which are added to the initial charge placed in the autoclave in amounts sufficient to provide about 0.01 mol Rh/liter of liquid in the vessel and 0.5 mol Li/mol Rh. The reaction is operated at about 180° C., 54.8 kg/cm² absolute, with partial pressures of about 35 kg/cm² CO and about 5.6 kg/cm² $H_2$. The liquid recycled after flashing contains about 4 wt % methyl iodide, 7 wt % methyl acetate, 32 wt % acetic anhydride, 24 wt % acetic acid, with about 1-2 wt % heavy residues. A slipstream is withdrawn from the recycle stream at a rate sufficient to maintain the residues in the autoclave at an acceptable level. The residue-containing liquid which remains after the gases have been separated is concentrated and treated with reagents to precipitate the rhodium content.

EXAMPLE 1

A sample of a flashed carbonylation reactor liquid is combined with sufficient methanol to provide 10 grams of a solution containing about 800 ppm by weight of rhodium. This solution was added to a solution of 0.1 grams of lithium peroxide in 50 ml of water. The mixture was allowed to react at room temperature for about one hour until precipitation was subtantially complete and then the solids and the supernatent liquid were separated and analyzed for their rhodium content. It was found that 99.7% of the rhodium was present in the solids, which were found to contain 3.1 weight percent rhodium.

Another sample of the flashed liquid is concentrated on a Rotovap at about 30° C. for about 2 hours at 1 mm Hg (torr.). Fifty (50) grams of the resulting residue, containing about 4600 ppm by weight of rhodium is added to 10 grams of lithium peroxide in 500 ml of water. After about one hour at room temperature, the solids and the solution are analyzed for rhodium and it is found that 99.6% of the rhodium remains in the solids, although 95% of the solids has been dissolved by the lithium peroxide solution.

The above example shows the effectiveness of peroxides, and particularly lithium peroxide, in precipitating residue containing rhodium(or other Group VIII noble metals) values from carbonylation residues.

EXAMPLE 2

Samples of the flashed residues are treated with alkali metal hydroxides to precipitate solids containing rhodium, as summarized in the following table.

TABLE A

| Gms. Residue | Solvent, gms | Rh ppm | Hydroxide | Amount | Temp | % Rh Recovery |
|---|---|---|---|---|---|---|
| 100 | — | 4600 | 1.0N NaOH | 1000 ml | room | 88.7 |
| 1 | MeOH, 9 | 800 | 0.1N LiOH | 50 ml | " | 93.9 |
| 1 | " | " | 0.5N LiOH | " | " | 96.8 |
| 1 | glyme, 9 | " | 0.5N LiOH | " | " | 85.9 |
| 1 | — | 8300 | 0.1N LiOH | 50 ml | " | 97.3 |

In addition to the methanol and glyme (ethylene glycol dimethylether) shown here, isopropyl alcohol has been found to be a useful solvent.

EXAMPLE 3

Alkali metal borohydrides may be used to supplement the caustic treatment. The following table shows a group of tests using such combinations.

| Gms. Residue | Solvent, gms | Rh ppm | Hydroxide Type | Amount | NaBH₄ Gms. | Temp % | % Rh Recovery |
|---|---|---|---|---|---|---|---|
| 1 | MeOH, 9 | 770 | 0.2N NaOH | 50 ml. | 0.4 | room | 98.5 |
| 1 | MeOH, 9 | 800 | 0.2N LiOH | " | 0.1 | " | 98.4 |
| 1 | glyme, 9 | 800 | 0.2N LiOH | " | 0.05 | " | 95.5 |
| 1 | — | 4600 | 0.2N NaOH | 25 ml | 0.1 | " | 99.8 |
| 1 | — | 4600 | 1.0N LiOH | 20 ml | 0.1 | " | 99.9 |

EXAMPLE 4

A 1 gm. sample of flashed residue is diluted with 9 gms. of methanol and added to a solution of 4 gms. of sodium bisulfite in 50 ml. of water and acidified with 1 gm of 57% HI. After one hour at room temperature it is found that 99.8% of the rhodium is in the solids which precipitate from the solution.

EXAMPLE 5

Organic reducing agents may also be used to precipitate solids containing rhodium from solutions of carbonylation residues.

A 1 gm sample of flashed residue is diluted with 9 gms of methanol and added to a solution containing 2 gms of paraformaldehyde in 50 ml of water. After one hour at room temperature it is found that 96.2% of the rhodium is in the solids which precipitate from the solution.

EXAMPLE 6

The direct use of the solids produced by the treatment of the invention is illustrated in the following test in which solids containing 6 wt % rhodium are substituted for a pure rhodium compound. The solids were obtained by treating a residue containing 0.46 wt % rhodium with NaOH and NaBH₄ as described in Example 3. % RH). The mixture is reacted for one hour at 190° C. 700 psig, (95% CO, 5% $H_2$) after which it is found that 91.4% of the methyl acetate has been converted with an 89.3% selectivity to acetic anhydride. It is observed that the solids containing rhodium performed in a generally similar manner to pur rhodium compounds.

EXAMPLE 7

Solids obtained by treating residue with 1N NaOH according to Example 3 are treated with an aqueous solution of hydrogen peroxide (30 wt %). When 10 ml of the solution is added to 1 gm. of the solids it is found after 1 hour at 25° C. that the rhodium remained in the solids, while about 60-70% of the solids have been dissolved. Thus, the rhodium concentration has been increased by a factor of about three.

What is claimed is:

1. A process for recovering rhodium from the high molecular weight residues containing organic carbonyl and acetate functions formed in rhodium-lithium catalyzed carbonylation reactions in which esters and ethers are combined with carbon monoxide in the presence of iodides to form anhydrides consisting essentially of:

(a) separating and concentrating said residue from the carbonylation reaction mixture;

(b) treating the separated and concentrated residue of (a) with a reagent capable of precipitating a solid containing substantially all the rhodium content of said residue and consisting of at least one member of the group consisting of alkali metal peroxides, alkali metal hydroxides, alkali metal borohydrides, acidified sodium bisulfate and formaldehyde;

(c) separating substantially all of the precipitated solid of (b).

2. A process of claim 1 further comprising: (d) returning said solid to the carbonylation reaction mixture for reuse.

3. A process of claim 2 wherein said separated solid is treated with an aqueous solution of hydrogen peroxide to concentrate the rhodium values.

4. A process of claim 1 wherein said alkali metal peroxide is at least one member of the group consisting of sodium and lithium peroxides.

5. A process of claim 1 wherein said alkali metal hydroxide is at least one member of the group consisting of sodium and lithium hydroxides.

6. A process of claim 1 wherein said alkali metal borohydride is at least one member of the group consisting of lithium, sodium, and potassium borohydrides.

7. A process of claim 1 wherein said reagent is an aqueous solution of hydrogen iodide and sodium bisulfite.

8. A process of claim 1 wherein said reducing agent is formaldehyde.

9. A process of claim 1, 2 or 3 wherein said separated residue of (a) is combined with a solvent.

10. A process of claim 9 wherein said solvent is an aliphatic alcohol.

* * * * *

UNITED STATES PATENT AND TRADEMARK OFFICE
CERTIFICATE OF CORRECTION

PATENT NO. : 4,434,240
DATED : February 28, 1984
INVENTOR(S) : Joseph Pugach

It is certified that error appears in the above-identified patent and that said Letters Patent are hereby corrected as shown below:

Column 6, line 51: Following "ple 3." delete "% RH)." and insert, beginning new paragraph:

-- To 1 liter Hastelloy B autoclave is charged 240 gms of methyl acetate, 80 gms of acetic acid, 85.2 gms of methyl iodide, 26.8 gms of lithium iodide, and 6.5 gms of the solids produced by treating the residue of Example 1 with NaOH and $NaBH_4$ (6 wt. % Rh). --

Column 6, line 56: Change "pur" to -- pure --.

Signed and Sealed this

Sixteenth Day of July 1985

[SEAL]

Attest:

DONALD J. QUIGG

Attesting Officer

Acting Commissioner of Patents and Trademarks